J. KEISER.
ROLLER BLIND PULLEY.
APPLICATION FILED JUNE 11, 1918.
1,278,801.
Patented Sept. 10, 1918.
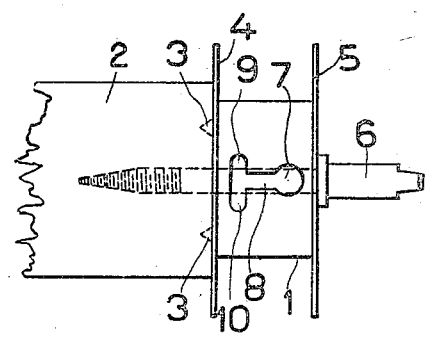
INVENTOR
JAN KEISER
BY
ATTORNEYS

UNITED STATES PATENT OFFICE.

JAN KEISER, OF THE HAGUE, NETHERLANDS.

ROLLER-BLIND PULLEY.

1,278,801.  Specification of Letters Patent.  Patented Sept. 10, 1918.

Application filed June 11, 1918. Serial No. 239,396.

*To all whom it may concern:*

Be it known that I, JAN KEISER, manufacturer, a subject of the Queen of the Netherlands, and residing at The Hague, the Netherlands, have invented certain new and useful Improvements in Roller-Blind Pulleys, of which the following is a specification.

The present invention is relating to improvements in roller blind pulleys and the like.

In providing a roller blind bar with a cord pulley of one of the kinds hitherto known the bar had to be finished at one end in such a way as to fit in the center part or drum of the pulley. To this purpose the bar was provided for example with a shoulder and the flat end face of the bar was disposed against the inner side of one of the side parts or disks between which the cord is to be wound up. The pulley was then secured by means of a pin serving at the same time as a journal at the pulley end of the bar and prevented from turning by nails driven into the bar through holes in one side part of the pulley.

This known construction presents several drawbacks. In the first place the bar end must be made fit to the center part of the pulley. Consequently, in order to obviate the necessity of manufacturing a large number of pulleys of different size, the diameter of the center part or drum must at the utmost be equal to the smallest bar diameter, all bars with a larger diameter having to be provided with a shoulder of said small diameter, which process entails extra costs. If the shoulder of a bar taken from stock is not exactly fit to the diameter of the drum of a pulley which has to be secured to the bar (for example in case the bar and the pulley have not been manufactured by the same works) the shoulder being for instance somewhat too thick, the diameter of the latter has to be reduced. This is often done in a very primitive manner so that the pulley is secured in an eccentric position which causes the blind to be wound up or off in an irregular manner.

Moreover, the pin on which the bar rotates at the pulley end when the blind is rolled up or off had to be driven through a central hole of the outer side part of the pulley into the wood of the bar lying immediately behind this side part; this presents the drawback that the pin always had a tendency to assume an oblique position with regard to the bar axis which fact also prevents a correct rotation of the bar.

The present invention is relating to a cord pulley presenting certain advantages over the known ones and being characterized in the first place by the feature that it is secured by means of a face provided with sharp projections against the flattened end face of the bar, *i. e.* without that a shoulder has to be provided at the bar end. Contrary to the known cord pulleys the side part of the cord pulley adapted to be arranged against the end face of the bar extends as far as possible inwardly from the circumference of the pulley drum in order to obtain the largest possible supporting surface, both side parts being thus provided with a central hole of such diameter that the central securing pin may be just passed through it. The better this pin fits in the holes, the greater will be the chance that the pin, which at the same time constitutes one of the journals of the bar, is not secured in an oblique manner but correctly in the axis of the bar.

The pulley according to the invention may be executed in metal as well as in another material, for example wood; a form of execution in metal is shown in the accompanying drawing.

This cord pulley is provided with a center part or drum 1 whose diameter is independent from that of the bar 2. The bar has a flat end face and the cord pulley is fixed upon the latter with the side part 4 provided with sharp projections 3 and secured by means of a screw pin 6 passing through the central holes in the side parts 4 and 5 of the pulley and screwed into the bar. The pin 6 which presses the pulley against the bar by means of a collar, is provided at its free end with a cylindrical part serving as one of the journals of the bar.

The thick part of the pin may also extend into the side part 4 of the pulley in which case the collar shown in the drawing becomes superfluous.

A further advantage of this form of execution of the pulley consists in that a free space is left between the pin 6 and the drum 1 which space may be used for receiving and attaching the cord end; to this purpose the drum is provided with an opening 7, 8, 9, 10 of a special shape. The cord end provided with a knot may be passed through the part 7 of the opening and then displaced to a narrower part 9 or 10 of the opening according to the sense in which the cord has to be wound around the drum. The knot then cannot leave the opening again, the cord being thus attached in a suitable manner. The outer end of the pin may be provided with flat sides in order that it may easier be screwed into the bar by means of a wrench. The projections 3 may be for example formed by triangular parts of the disk 4 set up outwardly until they are at right angles with this disk.

In case a pulley according to the invention is executed with a solid drum having a bore of the same diameter as the opening in the side parts, this bore too being thus exactly large enough that the pin may pass through it, there is of course no free space for receiving and attaching the cord end in the same manner as with the pulley shown by the drawing. However, this manner of attaching may then nevertheless be realized by providing the drum at its outside with a cavity (for example by milling) whose shape corresponds to that of the opening 7, 8, 9, 10 shown in the drawing.

With a wooden pulley the sharp projections may for example consist of pins driven into one of the lateral disks.

The advantages of a cord pulley according to the invention are the following:

The bar does not require to be made fit to the pulley, for example by being provided with a shoulder; it is only required that the bar possesses a flat end face. In consequence, pulleys of the same size may be secured without difficulty to bars of different diameter.

The form of execution in metal of the pulley as described furthermore presents, as it is, an opportunity for attaching the cord in a simple manner within the opening of special shape as described, which fact is due to the space left between the pin and the drum; a wooden pulley and executions of a similar kind may easily be adapted to this manner of attachment.

A pulley as described is easily to be secured in the correct manner by means of a pin owing to the small diameter of the central holes of the side parts. It is obvious that instead of being screwed into the bar the pin may also be driven into it with a sharp point.

Having now described my invention I declare that what I claim is:

1. A roller blind pulley comprising a drum having at one end a flange solid therewith, points projecting outwardly from said flange to enter the end of a roller, a flange at the opposite end of the drum and a supporting pin passing through the drum bore from said opposite end and projecting beyond the latter to afford a journal for the roller, substantially as described.

2. In roller blind pulleys the combination of a side part (4) provided with sharp projections (3) adapted to be driven into the end face of the bar and a central opening having a diameter corresponding to that of the securing pin (6), with a drum 1 provided with an opening (7, 8, 9, 10) of such shape that the cord end provided with a knot may be introduced into and attached in said opening.

3. A roller blind pulley comprising a cord winding drum with end flanges, the body of the drum between the flanges being recessed to afford a bayonet slot aperture for the cord end, substantially as described.

In testimony whereof I affix my signature in presence of two witnesses.

JAN KEISER.

Witnesses:
 I. I. HELSDON REX,
 O. O. LEWIS.